United States Patent
Lauermaa

(10) Patent No.: US 10,300,493 B2
(45) Date of Patent: May 28, 2019

(54) SHELL PLATE, METHOD FOR MAKING A SHELL PLATE AND A GRINDING MILL

(71) Applicant: OUTOTEC (FINLAND) OY, Espoo (FI)

(72) Inventor: Kari Lauermaa, Jyväskylä (FI)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 15/517,670

(22) PCT Filed: Oct. 12, 2015

(86) PCT No.: PCT/FI2015/050686
§ 371 (c)(1),
(2) Date: Apr. 7, 2017

(87) PCT Pub. No.: WO2016/059295
PCT Pub. Date: Apr. 21, 2016

(65) Prior Publication Data
US 2017/0304837 A1    Oct. 26, 2017

(30) Foreign Application Priority Data

Oct. 14, 2014 (FI) ..................................... 20145902

(51) Int. Cl.
*B02C 17/00* (2006.01)
*B02C 17/22* (2006.01)
(Continued)

(52) U.S. Cl.
CPC ........ *B02C 17/225* (2013.01); *B02C 17/1825* (2013.01); *B02C 17/002* (2013.01); *B02C 17/04* (2013.01)

(58) Field of Classification Search
CPC . B02C 17/18225; B02C 17/225; B02C 17/04; B02C 17/002; B02C 17/02
(Continued)

(56) References Cited

U.S. PATENT DOCUMENTS 3,295,772 A * 1/1967 Cunningham .......... B02C 17/18
                                                    241/182
3,783,918 A * 1/1974 Simpson ................. B27L 1/025
                                                    144/208.9
(Continued)

FOREIGN PATENT DOCUMENTS

| CN | 2382471 Y | 6/2000 |
| FR | 2 615 412 A1 | 11/1988 |
| WO | WO-2011130867 A2 | 10/2011 |

OTHER PUBLICATIONS

International Search Report issued by the European Patent Office in relation to International Application No. PCT/FI2015/050686 dated Jan. 28, 2016 (3 pages).
(Continued)

*Primary Examiner* — Faye Francis
(74) *Attorney, Agent, or Firm* — Robert P. Michal, Esq.; Carter, DeLuca & Farrell LLP

(57) ABSTRACT

The invention relates to a shell plate, to a method for making a shell plate and to a grinding mill for ore grinding. The shell plate is mountable to a shell of a grinding mill for grinding ore and includes a shell plate body having a first portion including a fixing surface for fixing the shell plate body to the shell, and a second portion having a wear surface facing toward an interior of the grinding mill. The first portion and the second portion form a continuous shell plate body, and the second portion includes polyurethane such that the wear surface is made of polyurethane.

22 Claims, 3 Drawing Sheets

(51) Int. Cl.
*B02C 17/18* (2006.01)
*B02C 17/04* (2006.01)

(58) Field of Classification Search
USPC .................................. 241/182, 183, 300
See application file for complete search history.

(56) References Cited

U.S. PATENT DOCUMENTS

| | | | | |
|---|---|---|---|---|
| 4,446,192 A * | 5/1984 | Dehlen | ................ | B02C 17/225 241/183 |
| 4,580,734 A * | 4/1986 | Eroskey | ................ | B02C 17/225 241/182 |
| 4,678,530 A | 7/1987 | Eroskey et al. | | |
| 5,431,351 A * | 7/1995 | Lejonklou | ............. | B02C 17/225 241/183 |
| 5,472,148 A * | 12/1995 | Schaeffer | ............. | B02C 17/225 241/183 |
| 5,752,665 A * | 5/1998 | Wason | ................. | B02C 17/225 241/183 |
| 6,189,280 B1 * | 2/2001 | Malmberg | ............ | B02C 17/225 241/183 |
| 8,136,649 B2 * | 3/2012 | Burstrom | ............. | B65G 11/166 193/2 R |
| 8,152,086 B2 * | 4/2012 | Moller | ................. | B02C 17/225 241/183 |
| 8,235,318 B2 * | 8/2012 | Timm | .................. | B02C 17/225 241/183 |
| 9,475,058 B2 * | 10/2016 | Town | .................... | B02C 17/225 |
| 2003/0062372 A1 * | 4/2003 | Malmberg | ........... | B65D 90/041 220/500 |
| 2008/0317992 A1 * | 12/2008 | Malmberg | ........... | B02C 17/225 428/44 |
| 2009/0173595 A1 * | 7/2009 | Burstrom | ............. | B02C 17/225 193/25 E |
| 2010/0127109 A1 * | 5/2010 | Moller | ................. | B02C 17/225 241/182 |
| 2011/0073694 A1 * | 3/2011 | Timm | .................. | B02C 17/225 241/182 |
| 2011/0186670 A1 * | 8/2011 | Town | .................... | B02C 17/22 241/182 |

OTHER PUBLICATIONS

Written Opinion of the International Searching Authority issued by the European Patent Office in relation relation to International Application No. PCT/FI2015/050686 dated Jan. 28, 2016 (5 pages).
International Preliminary Report on Patentability issued by the European Patent Office in relation to International Patent Application No. PCT/FI2015/050686 dated Sep. 23, 2016 (6 pages).
Chilean Official Action issued by the Chilean Patent Office in relation to Chilean Application No. 869-2017 dated May 17, 2018 (9 pages). (resubmission of IDS dated Jul. 27, 2018).

* cited by examiner

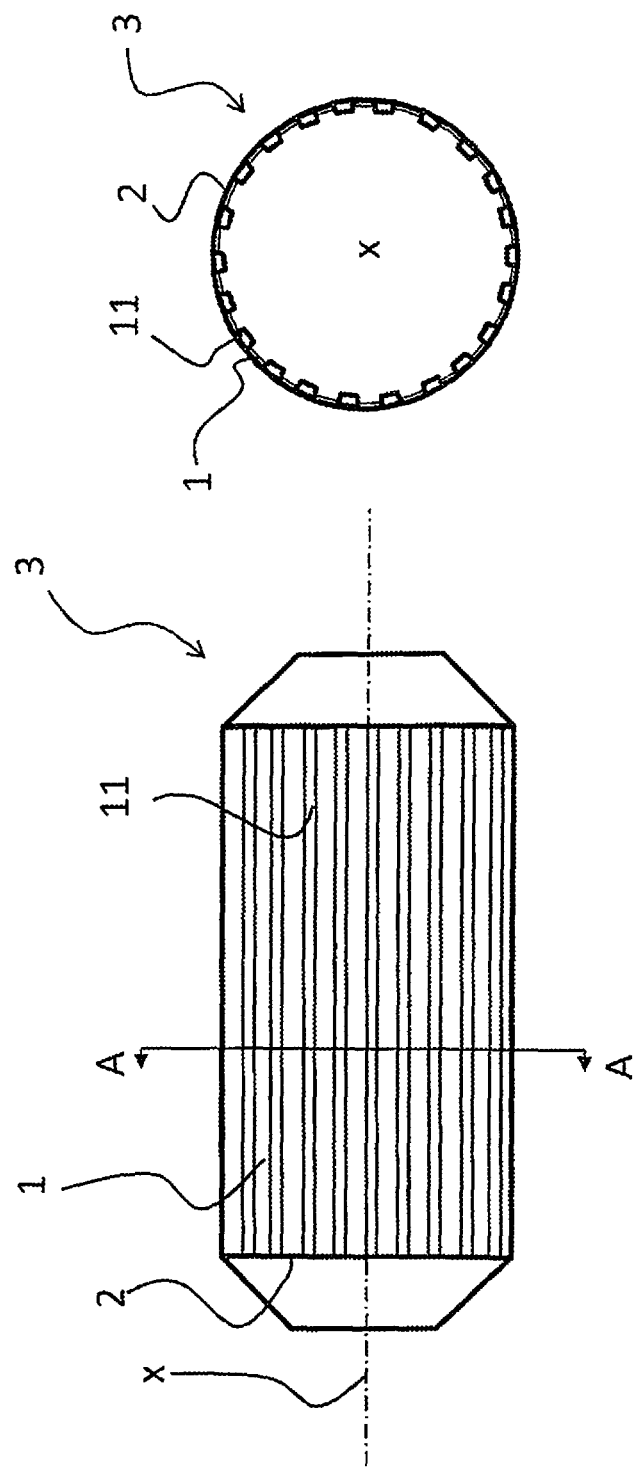

SHELL PLATE, METHOD FOR MAKING A SHELL PLATE AND A GRINDING MILL

CROSS-REFERENCE TO RELATED APPLICATONS

This application is a National Phase Entry under 35 U.S.C. § 371 of PCT Patent Application Ser. No. PCT/FI2015/050686 filed Oct. 12, 2015, which claims priority to Finnish Patent Application No. 20145902, filed Oct. 14, 2014, the disclosure of each of these applications is expressly incorporated herein by reference in their entirety.

FIELD OF THE INVENTION

The invention relates to a shell plate. The invention further relates to a method for making a shell plate and to a grinding mill for ore grinding.

BACKGROUND OF THE INVENTION

Grinding mills are used for processing hard solid material such that large solid material is grinded into smaller pieces. Lifting bars assist in lifting the solid material that is being processed in the drum as it rotates and the shell plates' function is to protect the shell of the grinding mill.

BRIEF DESCRIPTION OF THE INVENTION

The shell plate according to the invention, the method for making a shell plate according to the invention and the grinding mill according to the invention are characterized by what is stated in the independent claims. The preferred embodiments of the invention are disclosed in the dependent claims.

The solid material is crushed in a drum shaped shell mounted for rotation about its central axis in the grinding mill. The axis of the rotatable shell is generally horizontally arranged or slightly inclined towards one end in the grinding mill. The interior of the shell forms a treatment chamber and has a cylindrical wall. The inner surface of the chamber is plated with a lining for protecting the shell because the material to be processed is fed to the treatment chamber and grinding it causes wear in the chamber. The interior wall of the shell is equipped with lifter bars for lifting the material inside the shell along the rotation so that as the shell rotates the shell plates lift up the solid material along the inside wall of the shell to a point where gravity causes the solid material to fall down inside the shell and by falling down the solid material is crushed. In order to protect the shell of the grinding mill shell plates are arranged in between adjacent lifter bars.

Lifter bars as well as shell plates extend from one end of the drum to another end and they are arranged in a short spacing adjacently along the cylindrical wall of the shell. The shell plates do not protrude from the shell wall as much as the lifter bars which assist in lifting the solid material. The shell plates have an outer surface and comprise a shell plate body having a fixing surface for connecting the shell plate to the shell of the grinding mill. The shell plate body has an outer surface comprising a fixing surface to be arranged against the shell and a wear surface facing toward interior of the grinding mill. The shell plate body comprise a first portion and a second portion forming a continuous shell plate body, said first portion comprises the fixing surface which is arranged against the shell when connected to the grinding mill.

The shell plate is mountable to a shell of a grinding mill for grinding ore. The shell plate may be secured to the shell of the grinding mill such that the adjacent lifter bars interlock the shell plate to its place or the shell plate may have a fixing element embedded to the shell plate which forms part of the fixing surface of the shell plate. When mounted to the shell the fixing surface is arranged against the shell and the shell plate is secured to the shell through the fixing element in the shell plate or through adjacent lifter bars. When having a fixing element the shell plates are mechanically fastened to the inner surface of the shell with fastening means such as a bolt connection through the fixing element. When the shell plate is installed to the shell of the grinding mill the fixing surface of the shell plate body is faced against the inner surface of the shell of the grinding mill.

A grinding mill for ore grinding comprises multiple shell plates arranged to a shell of the grinding mill, the shell plates being as described earlier. The shell plate is used in grinding mills having grinding energy per ton of ore of 1-30 kWh/t and preferably 3-20 kWh/t. The diameter of the grinding mill is 1-15 m, and most typically 1.5-10 m. The length of the grinding mill in horizontal direction is between 1 and 15 meter, and most typically from 2 to 8 m. Thickness of the shell of the grinding mill is 0.5-10 cm. Grinding mills can be for example SAG mills, AG mills, Ball mills, rod mills, scrubbers or regrinds.

The grinding mill comprises multiple lifter bars arranged to the shell, which the lifter bars comprise a lifter bar body having a fixing surface for fixing the lifter bar to the shell and a wear surface facing toward interior of the grinding mill, the wear surface of the lifter bars and the wear surface of the shell plates comprise polyurethane. The grinding mill is arranged to grind input material of which at least 80% has particle size between 0.1-300 mm, preferably 1-250 mm and most preferably 80-220 mm to grinded output material of which 80% has particle size between 0.02-3 mm, preferably 0.05-2.5 mm and most preferably 0.2-2 mm.

The grinding mill comprises a lifter bar arranged to the shell, which the lifter bar has a volume. The lifter bar further has an outer surface comprising a fixing surface to be arranged against the shell and a wear surface facing toward interior of the grinding mill. The lifter bar comprises a lifter bar body having an outer surface conforming the outer surface of the lifter bar and a fixing element for connecting the lifter bar to the shell of the grinding mill. The lifter bar body further comprising a first portion and a second portion forming a continuous lifter bar body, the fixing element is embedded to the first portion such that it forms part of the fixing surface of the lifter bar. The second portion is made of polyurethane and forms 35-85% of the volume of the lifter bar and the first portion of the lifter bar body is made of rubber or the first portion of the lifter bar body is made of other polyurethane than the polyurethane in the second portion of the lifter bar body.

The shell plate comprises a shell plate body which has a first portion comprising a fixing surface for fixing the shell plate body to the shell and a second portion comprising a wear surface facing toward interior of the grinding mill, said first portion and said second portion forming a continuous shell plate body. The second portion comprises polyurethane such that the wear surface is made of polyurethane.

The polyurethane in the context of this application means polyurethane material that may comprise additives, such as metal particles, ceramics or carbide. The polyurethane material comprises at least 50% and preferably at least 80% pure polyurethane the rest being additives and possible impurities.

The polyurethane may comprise additives, such as metal particles, ceramics or carbide.

In one embodiment of the shell plate the second portion is made of polyurethane.

In another embodiment of the shell plate the first portion is made of polyurethane.

In still another embodiment of the shell plate the first portion is made of recycled polyurethane.

In still another embodiment of the shell plate the second portion is made of more wear resistant polyurethane than the first portion.

In an embodiment of the shell plate the first portion comprises rubber. In another embodiment of the shell plate the first portion is made of rubber. The rubber may be recycled rubber.

Between 40 to 80%, preferably between 45 to 70%, of the second portion of the shell plate body is polyurethane. The shell plate has a thickness between 3 to 20 cm, preferably between 4 to 15 cm.

Method for making a shell plate as described earlier comprises steps of providing a mould for moulding the shell plate, adding polyurethane into the mould for forming the shell plate body. The polyurethane is in such a state that it is arranged to react in the mould and form a connection with a material of the first portion of the shell plate body and adding material into the mould for forming the first portion of the shell plate body such that the polyurethane is arranged to react in the mould with the material for forming a continuous shell plate body with the second portion of the shell plate body. Shell plates can be made with moulds made of sheet metal having a thickness between 0.1 to 10 mm, preferably less than 5 mm and most preferably 0.2-2 mm.

In an embodiment of the method the step of adding material into the mould comprises adding material other than the polyurethane of the second portion into the mould for forming the first portion of the shell plate body.

In another embodiment of the method the step of adding material into the mould comprises adding polyurethane into the mould for moulding the first portion of the shell plate body.

When arranging polyurethane into the mould the polyurethane is in such a state that it is arranged to react in the mould and form a connection with a material of the first or the second portion of the shell plate body.

The first portion of the shell plate body may be the same material as the second portion of the shell plate body or it may be different material than the second portion, for example rubber, recycled rubber or polyurethane having different properties than the polyurethane in the second portion of the shell plate body. The method may further comprise a step of adding other material than the polyurethane of the second portion into the mould for forming the first portion of the shell plate body, the material of the first portion is in such a state that it is arranged to react in the mould such that the polyurethane in the second portion and the material in the first portion form a connection with each other for forming a continuous shell plate body.

In still another embodiment of the method the mould has an interior space and the step of adding material into the mould comprises adding material in a form of providing a base member. In this embodiment the method further comprises the steps of joining the mould and the base member together to form a cavity defined by the base member and the interior space; and the step of adding polyurethane comprises adding the polyurethane to fill the cavity with polyurethane.

Effect of a shell plate comprising polyurethane is that the polyurethane needs less pressure and heat than other materials, such as rubber, and energy consumption can be reduced in manufacturing. Also the manufacturing process is easier because shell plate comprising polyurethane can be made using mould made from sheet metal. The shell plates can be retreated with new polyurethane when the wear surface has worn away. This retreatment can be made in smaller scale near to the factory so the need for transportation is less.

BRIEF DESCRIPTION OF THE DRAWINGS

In the following the invention will be described in greater detail by means of preferred embodiments with reference to the attached drawings, in which
FIG. 1 shows a grinding mill;
FIG. 2 shows a cross section of the grinding mill in FIG. 1.

DETAILED DESCRIPTION OF THE INVENTION

Figure 3:
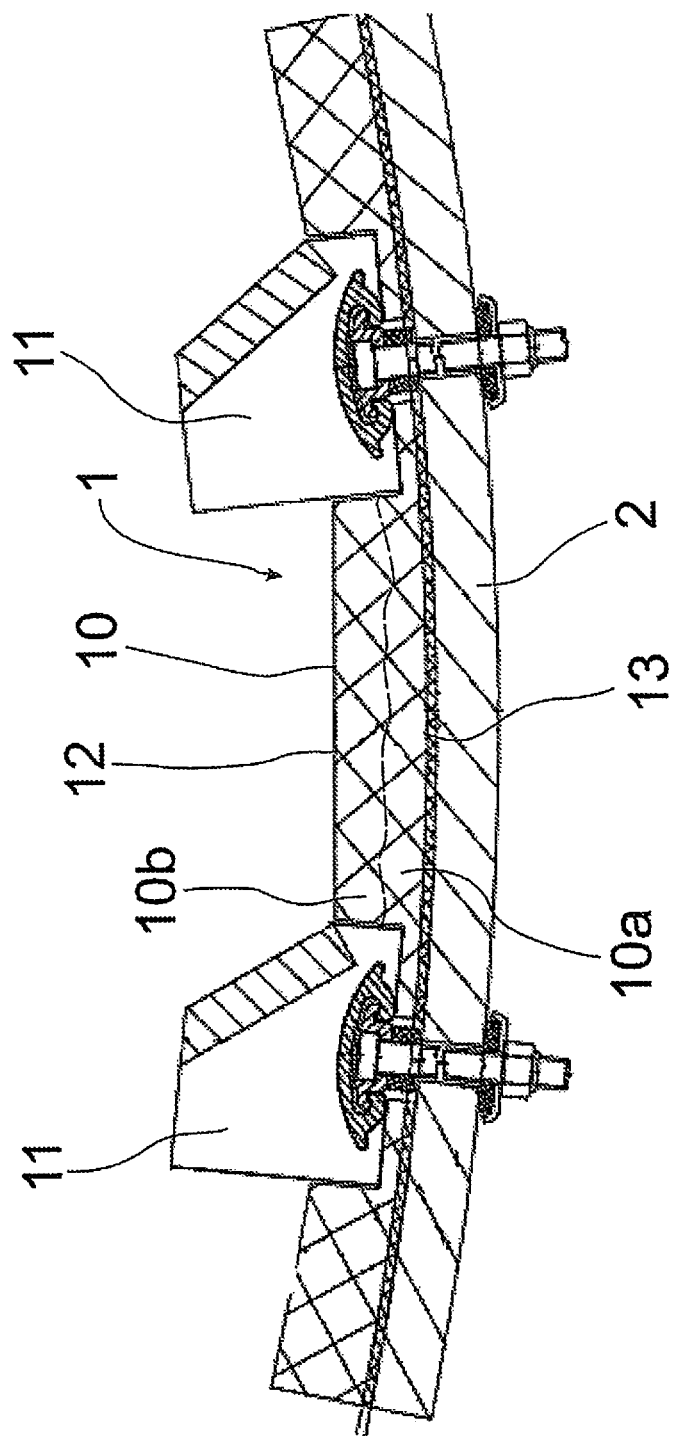
FIG. 3 shows a shell plate.

FIG. 1 shows a longitudinal cross-section of a horizontal grinding mill 3 having an inner shell 2 comprising a cylindrical wall which the shell 2 comprises lifter bars 11 mounted to the cylindrical wall of the shell 2 and in between the lifter bars 11 there are shell plates 1. The grinding mill 3 rotates about its central axis x in a predetermined direction. The axis of the shell 2 is horizontally disposed or slightly inclined toward the other end of the shell 2. The surface of the inner shell 2 is plated with shell plates 1 for protecting the drum against wear caused by grinding. The shell plates 1 is attached between the lifter bars 11 such that the lifter bars 11 and the shell plates 1 together protect the surface of the inner shell 2 of the grinding mill 3.

FIG. 2 shows a cross-section of the grinding mill 3 shown in FIG. 1 taken along line A-A. The grinding mill 3 rotates in a predetermined direction around its axis indicated by x. The shell plates 1 and the lifter bars 11 are arranged such that they are mounted to the shell 2 of the grinding mill 3 extending in the longitudinal direction of the horizontally arranged grinding mill 3. The shell plate 1 is secured to the shell 2 of the grinding mill 3 with fasteners such as bolts extending from the shell 2 of the grinding mill 3 to a fixing element embedded to the shell plate 1 or the shell plate 1 is secured with an interlocking effect provided by adjacent lifter bars 11.

The shell plate 1 has the same or substantially same degree of curvature as the shell 2 of the grinding mill 3. The curvature is especially on the fixing surface 13 of the shell plate 1 but the same or similar curvature may be also on the wear surface 12 of the shell plate 1.

The shell plate 1 may be made of polyurethane such that the whole shell plate 1 is made of same polyurethane or the shell plate 1 may comprise rubber, which is preferably but not necessarily recycled rubber, and polyurethane such that the polyurethane forms at least part of the wear surface 12 of the shell plate 1, or the shell plate may comprise polyurethane such that at least the wear surface 12 comprises new polyurethane and the rest of the shell plate 1 comprises recycled polyurethane or other polyurethane than that of the polyurethane in the wear surface 12. The difference in polyurethanes comes from different properties in polyurethane, such as additives.

The polyurethane may comprise additives, such as metal particles, ceramics or carbide. The parts of the shell plate body that are formed by polyurethane are mostly polyurethane and if there are the additives, the additives form smaller part than the polyurethane.

FIG. 3 shows a shell plate 1 together with the adjacent lifter bars 11 arranged to a shell 2 of a grinding mill. The shell plate 1 comprises a shell plate body 10 which is divided into a first portion 10a comprising a fixing surface 13 for fixing the shell plate body 10 to the shell 2 and into a second portion 10b comprising a wear surface 12 facing toward interior of the grinding mill 3. The first portion 10a and the second portion 10b form a continuous shell plate body 10. At least part of the shell plate body 10 comprises polyurethane. The division into the first portion 10a and into the second portion 10b is imaginary when the shell plate body is completely made of polyurethane. When the shell plate body 10 comprises different materials for example such that polyurethane forms the second portion 10b of the shell plate body 10 and rubber forms the first portion 10b of the shell plate body 10 then the division is according to the materials.

The shell plate 1 is in this embodiment mounted to the shell 2 of the grinding mill with an interlocking effect by adjacent lifter bars 11. The shell plates 1 are first arranged against the shell 2 and then the lifter bars 11 are arranged such that part of the lifter bars 11 are on top of the side of the shell plates 1 so that part of the shell plate 1 is compressed between the shell 2 and the lifter bar 11 when the lifter bar 11 is secured to the shell with fixing means.

Figure 4A:
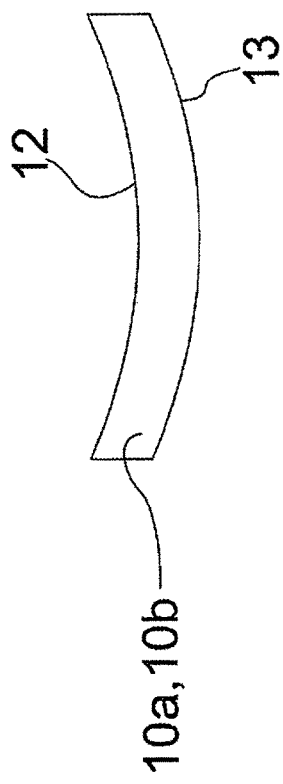
FIGS. 4a, 4b and 4c show embodiments of a shell plate.

FIG. 4a shows an embodiment of a shell plate 1 completely made of polyurethane. The completely means that the complete shell plate body 10 having a first portion 10a and a second portions 10b is made of polyurethane but the polyurethane may comprise additives as earlier described. The shell plate body 10 is now imaginarily dived into the first portion 10a and into the second portion 10b because the whole shell plate body 10 is of one material. The second portion 10b comprises a wear surface 12 and the first portion 10a comprises a fixing surface 13.

Figure 4B:
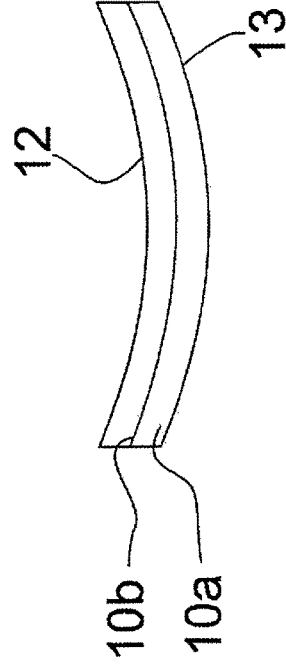

FIG. 4b shows an embodiment of the shell plate 1 comprising only polyurethane. First example of the embodiment shown in FIG. 4b is such that the first portion 10a is made of polyurethane and the second portion 10b is made of other polyurethane than that of the first portion 10a. The polyurethane in the first portion 10a and the polyurethane in the second portion 10b have different properties. The difference in properties may be for example such that the polyurethanes in different portions have difference in wear resistance for example such that the difference in wear resistance is 10%. Another example of the embodiment shown in FIG. 4b is such that the first and the second portion 10a, 10b both are made of the same polyurethane but they are made at different times, i.e. not simultaneously. The other polyurethane may be for example recycled polyurethane.

Figure 4C:
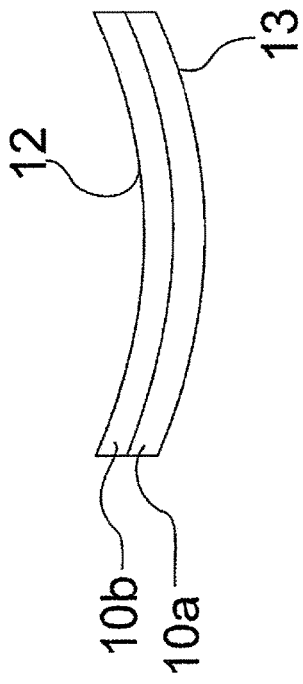

FIG. 4c shows an embodiment of a shell plate 1 comprising a first portion 10a made of rubber and a second portion 10b made of polyurethane. The first portion 10a made of rubber may be made of recycled rubber.

The curvature of the shell plates 1 are exaggerated in FIGS. 4a-4c and in reality they are much less curved. Radius of the outer surface of the first portion could be for example between 0.3-10 m. Radius of the outer surface of second portion could be at least 0.3 m, preferably 0.3 m-10 m. The outer surface of the second portion could even be straight. The outer surface of the second portion 10b is the wear surface 12 of the shell plate 1 which is toward the interior of the grinding mill and the outer surface of the first portion 10a is the fixing surface 13. The shell plates 1 are 3-20 cm thick, preferably 4-15 cm, for example 10 cm. The shell plates 1 comprise polyurethane 40-80% and preferably 45-70%.

It will be obvious to a person skilled in the art that, as the technology advances, the inventive concept can be implemented in various ways. The invention and its embodiments are not limited to the examples described above but may vary within the scope of the claims.

The invention claimed is:

1. A shell plate configured to be mounted to a shell of a grinding mill for grinding ore, comprising:
    a body having a first portion and a second portion, the first and second portions forming a continuous body, the first portion comprising a fixing surface configured to fix the body to the shell of the grinding mill, the second portion comprising a wear surface disposed in an opposite direction to the fixing surface of the first portion, wherein the wear surface of the second portion is made of polyurethane and the first portion is made of rubber, wherein 40-80% of the shell plate is made of polyurethane.

2. The shell plate according to claim 1, wherein the polyurethane comprises at least one of metal particles, ceramics or carbide disposed therein.

3. The shell plate according to claim 1, wherein the rubber comprises recycled rubber.

4. The shell plate according to claim 1, wherein 40-80% of the second portion of the body is made of polyurethane.

5. The shell plate according to claim 1, wherein the shell plate has a thickness of 3-20 cm.

6. The shell plate according to claim 1, wherein 45-70% of the second portion of the body of the shell plate is made of polyurethane.

7. The shell plate according to claim 1, wherein the shell plate has a thickness of 4-15 cm.

8. A grinding mill for ore grinding, comprising;
    a shell disposed on a portion of the grinding mill, the shell comprising:
        multiple shell plates arranged on the shell of the grinding mill, wherein each shell plate of the multiple shell plates comprises the shell plate according to claim 1.

9. The grinding mill according to claim 8, wherein the grinding mill is configured to output a grinding energy per ton of ore of 1-30 kWh/t.

10. The grinding mill according to claim 8, wherein the grinding mill defines a circular profile having a diameter of 1-15 m.

11. The grinding mill according to claim 8, wherein the grinding mill has a length of 1-15 m in a horizontal direction.

12. The grinding mill according to claim 8, wherein the shell of the grinding mill has a thickness of 0.5-10 cm.

13. The grinding mill according to claim 8, wherein the grinding mill comprises multiple lifter bars arranged on the shell of the grinding mill, the lifter bars comprising a lifter bar body having a fixing surface for fixing the lifter bar to the shell of the grinding mill and a wear surface facing toward an interior of the grinding mill, wherein the wear surface of the lifter bars and the wear surface of the shell plates comprise polyurethane.

14. The grinding mill according to claim 8, wherein the grinding mill is arranged to grind an input material of which at least 80% has a particle size between 0.1-300 mm to grinded output material of which 80% has a particle size between 0.02-3 mm.

15. The grinding mill according to claim 14, wherein the grinding mill is configured to grind an input material of which at least 80% has a particle size between 1-250 mm.

16. The grinding mill according to claim 14, wherein the grinding mill is configured to grind an input material of which at least 80% has a particle size between 80-220 mm.

17. The grinding mill according to claim 14, wherein the grinding mill is configured to grind an input material of which at least 80% has a particle size that is between 0.1-300 mm to a grinded output material of which 80% has a particle size between 0.05-2.5 mm.

18. The grinding mill according to claim 14, wherein the grinding mill is configured to grind an input material of which at least 80% has a particle size that is between 0.1-300 mm to a grinded output material of which 80% has a particle size between 0.2-2 mm.

19. The grinding mill according to claim 8, wherein the grinding mill comprises a lifter bar arranged on the shell of the grinding mill, the lifter bar having an outer surface comprising a fixing surface to be arranged against the shell of the grinding mill and a wear surface facing toward an interior portion of the grinding mill, wherein the lifter bar comprises a lifter bar body having an outer surface conforming to the outer surface of the lifter bar and a fixing element for connecting the lifter bar to the shell of the grinding mill, the lifter bar body further comprising a first portion and a second portion forming a continuous lifter bar body, the fixing element is embedded to the first portion such that the fixing element forms part of the fixing surface of the lifter bar, the second portion is made of polyurethane and forming 35-85% of a volume of the lifter bar and the first portion of the lifter bar body is made of rubber or the first portion of the lifter bar body is made of other polyurethane than the polyurethane in the second portion of the lifter bar body.

20. The grinding mill according to claim 8, wherein the grinding mill is configured to output a grinding energy per ton of ore of 3-20 kWh/t.

21. The grinding mill according to claim 8, wherein the grinding mill has a diameter of 1.5-10 m.

22. The grinding mill according to claim 8, wherein the grinding mill has a length of 2-8 m in a horizontal direction.

* * * * *